US009121746B2

(12) United States Patent
Knowles et al.

(10) Patent No.: US 9,121,746 B2
(45) Date of Patent: Sep. 1, 2015

(54) LIQUID LEVEL SENSOR WITH IMPROVED TEMPERATURE RANGE

(75) Inventors: Terence J. Knowles, Lake Barrington, IL (US); Brian J. Truesdale, Wauconda, IL (US); Kenneth A. Albrecht, Zion, IL (US); Steven C. Crusius, Gurnee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 395 days.

(21) Appl. No.: 13/642,633

(22) PCT Filed: Jun. 14, 2011

(86) PCT No.: PCT/US2011/040369
§ 371 (c)(1),
(2), (4) Date: Jan. 2, 2013

(87) PCT Pub. No.: WO2011/159711
PCT Pub. Date: Dec. 22, 2011

(65) Prior Publication Data
US 2013/0091946 A1    Apr. 18, 2013

Related U.S. Application Data

(60) Provisional application No. 61/354,855, filed on Jun. 15, 2010.

(51) Int. Cl.
*G01F 23/296* (2006.01)

(52) U.S. Cl.
CPC ........ *G01F 23/2962* (2013.01); *G01F 23/2961* (2013.01); *G01F 23/2965* (2013.01)

(58) Field of Classification Search
CPC .................................................. G01F 23/2962
USPC .................................................... 73/644
See application file for complete search history.

(56) References Cited

U.S. PATENT DOCUMENTS

| 3,656,134 A | 4/1972 | Brown |
| 5,737,963 A * | 4/1998 | Eckert et al. ............... 73/290 V |
| 6,073,492 A * | 6/2000 | Rosselson et al. ............... 73/644 |

FOREIGN PATENT DOCUMENTS

| DE | 8816383 U1 | 8/1989 |
| GB | 813497 A | 5/1959 |
| WO | 00/36391 A2 | 6/2000 |

OTHER PUBLICATIONS

An International Search Report, dated Sep. 28, 2011, issued in International Application No. PCT/US2011/040369.

* cited by examiner

*Primary Examiner* — Hezron E Williams
*Assistant Examiner* — Mark A Shabman

(57) ABSTRACT

An ultrasonic liquid-height detector employs conductive rods extending from a housing, and corresponding transducers, into a liquid, where elastic seals surround the rods at their exit point from the housing. Acoustic crosstalk between the rods through the seals and the housing (rather than through the liquid) is minimized by displacing the seals from each other as measured through the housing to increase a path length through the housing so that the crosstalk energy is delayed with respect to the direct energy indicating liquid height. A sampling window is positioned to sample transmitted sound across the rods at a time before the arrival of the crosstalk energy.

20 Claims, 2 Drawing Sheets

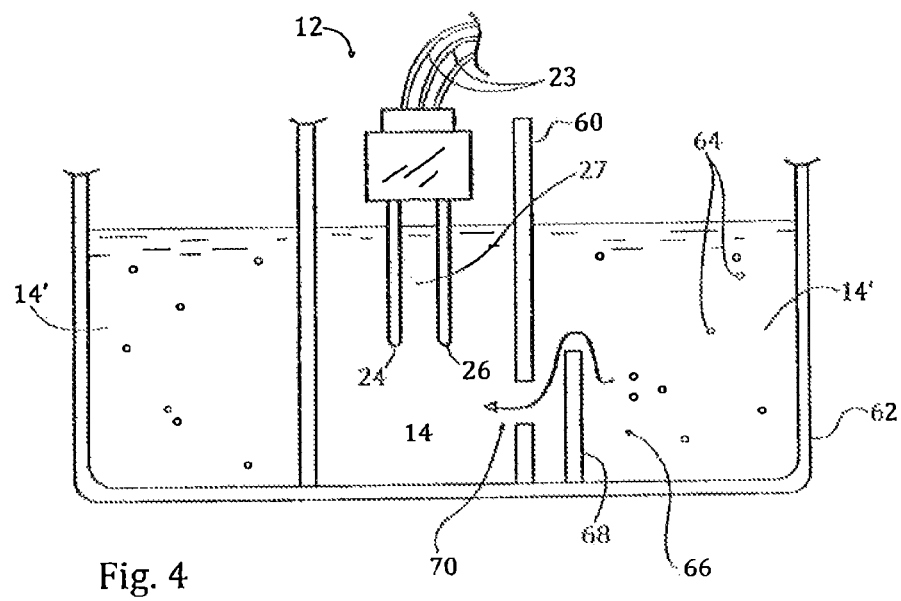
Fig. 4
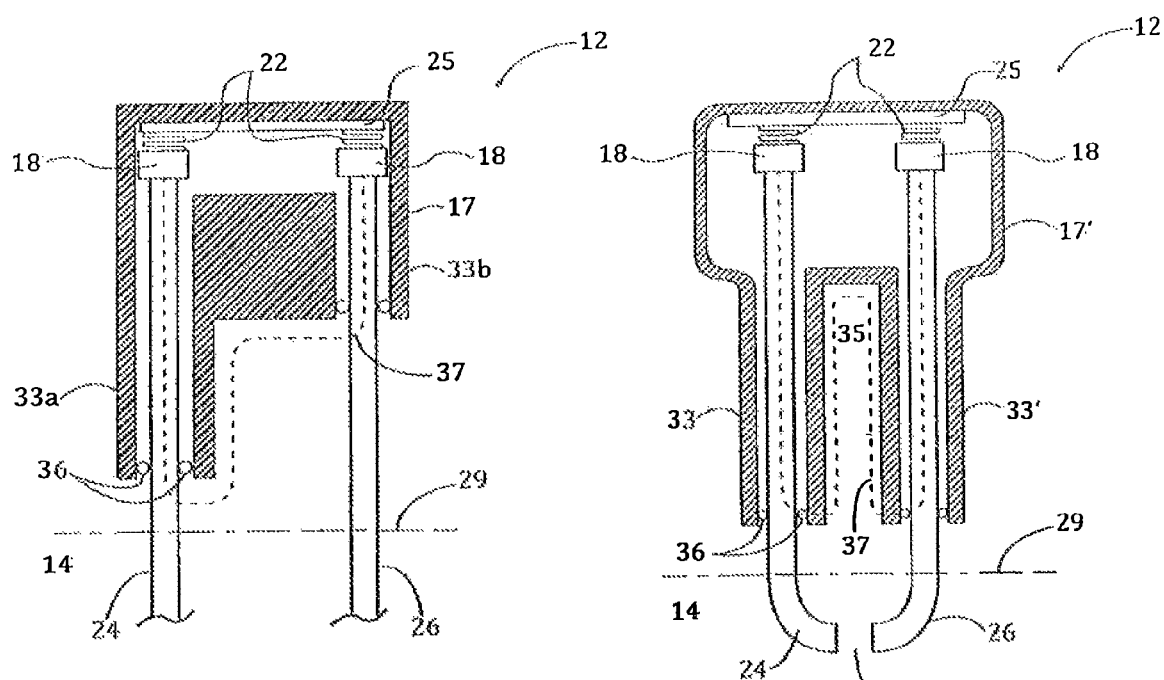
Fig. 5
Fig. 6

LIQUID LEVEL SENSOR WITH IMPROVED TEMPERATURE RANGE

RELATED APPLICATIONS

The present application is a National Stage of International Application No. PCT/US2011/040369, filed Jun. 14, 2011, and claims priority from, U.S. Provisional Application No. 61/354,855, filed Jun. 15, 2010.

FIELD OF THE INVENTION

The present invention relates to a fluid level sensor and, more particularly, to a fluid level sensor that provides improved operation over a wide temperature range.

BACKGROUND OF THE INVENTION

One popular type of liquid level sensor employs an ultrasonic transmitter and receiver opposed across a gap. When a liquid level rises to fill the gap, the improved acoustic coupling between the transmitter and receiver can be detected.

Some disadvantages to this design include the manufacturing complexity of accurately positioning ultrasonic transducers in proper alignment within the gap and limitations to the operating temperature of the sensor imposed by temperature sensitivity of the transducer materials.

SUMMARY OF THE INVENTION

The present invention provides an ultrasonic liquid level sensor that places the ultrasonic transmitter and receiver within a protective housing and uses conductive rods to communicate the ultrasonic signals into the liquid for measurement. A problem of crosstalk between the conductive rods through the housing, inherent in a remote transducer design, is accommodated by construction of the housing so that the ultrasonic path length through the housing is different from that of the ultrasonic path length through the liquid. Special circuitry is used to sample the transmitted ultrasonic signal at a time period free from crosstalk as a result of these differences in ultrasonic path lengths. One embodiment of the invention also provides an isolating chamber for the conductive rods that reduces entrained air within the liquid being sensed. The chamber communicates with a larger reservoir of the liquid through a small port that minimizes the transfer of liquid between the isolating chamber and the larger reservoir and that may include a baffle selectively excluding air bubbles.

Other features and advantages of the invention will become apparent to those skilled in the art upon review of the following detailed description, claims and drawings in which like numerals are used to designate like features.

BRIEF DESCRIPTION OF THE DRAWINGS

FIG. 2 is a block diagram of the detector circuitry as may be implemented on a microcontroller or the like;

FIG. 4 is a cross-sectional view of a baffle used to reduce the effects of entrained air;

FIG. 5 is a figure similar to that of FIG. 1 showing the reduction of crosstalk by unequal housing leg lengths; and FIG. 6 is a figure similar to that of FIGS. 1 and 5 showing reduction of crosstalk by displacement of supporting seals away from the transducers.

Figure 1:
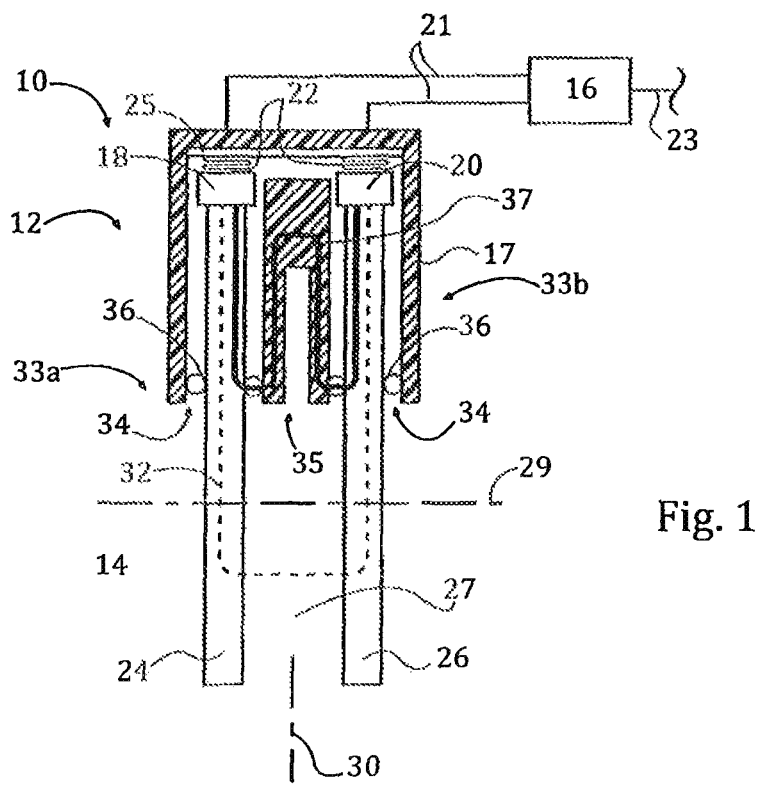
FIG. 1 is a simplified diagram of the liquid level sensor of the present invention and its associated detector circuitry showing a direct ultrasonic path through the sensed liquid and crosstalk ultrasonic path through a housing of the sensor as mitigated by a slot in the housing.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, an ultrasonic liquid level sensor 10 may include a sensing unit 12 positioned near a liquid 14 whose height is to be measured and sensing circuitry 16 for producing and processing signals transmitted to and received from the sensing unit 12.

The sensing unit 12 may include a housing 17 typically of an electrically insulating thermoplastic or the like, for example, glass-filled nylon, providing a protective enclosure for a transmitting transducer 18 and a receiving transducer 20 operating at ultrasonic frequencies. Such transducers may be, for example, piezoelectric materials operating to receive an electrical signal to produce an ultrasonic vibration or when stimulated by an ultrasonic vibration to produce a corresponding electrical signal.

The transducers 18 and 20 may communicate via spring contacts 22 with a printed circuit board 25 in turn providing connecting leads 21 to the sensing circuitry 16. The connecting leads 21 provide an electrical signal to the transmitting transducer 18 from the sensing circuitry 16 and communicate electrical signals generated by the receiving transducer 20 to the sensing circuitry 16. Sensing circuitry 16 may in turn communicate a signal indicating a liquid height 29 via a serial data or a simple logic level over lead 23 with equipment (not shown) requiring information about liquid height 29.

Each of the transducers 18 and 20 may be coupled to a corresponding conductive rod 24 and 26, for example, stainless steel, extending along an axis 30 into a liquid 14 whose height is to be measured. The conductive rods 24 and 26 are spaced apart across a gap 27 which will contain the liquid 14 when the liquid 14 is at a predetermined liquid height 29 and will be absent of liquid 14 when the liquid 14 is below the predetermined liquid height 29.

During operation of the ultrasonic liquid level sensor 10, the conductive rod 24, as driven by transmitting transducer 18, will conduct extensional ultrasonic waves along the axis into the liquid 14. It will be appreciated that alternative vibration modes may also be used including longitudinal, torsional and shear waveforms. Typically the waves will be implemented as periodic pulses having a predetermined pulse time. When liquid 14 is within the gap 27, the ultrasonic waves will be conducted to conductive rod 26 and in turn to the receiving transducer 20 where it will be detected.

This "direct" ultrasonic path 32 thus proceeds from transmitting transducer 18 through conductive rod 24, through the gap 27 through the liquid 14 into conductive rod 26 and to receiving transducer 20. As will be described, the presence of the liquid 14 above the predetermined liquid height 29 is deduced within the sensing circuitry 16 by comparison of the amplitude of the signal to a predetermined threshold at a predetermined time.

In order to protect the transducers 18 and 20 from the liquid 14 as well as environmental contaminants, the housing 17 may fully enclose the transducers 18 and 20 and the conductive rods 24 and 26 may pass out of the housing 17 through apertures 34 sealed, for example, by O-ring seals 36 fitting tightly between inner walls of the apertures 34 and the outer diameters of the conductive rods 24 and 26. The O-ring seals 36 may, for example, fluoroelastomer material which remains pliant at low temperatures.

The present inventors have determined that such seals provide an alternative "crosstalk" ultrasonic path 37 from the first transducer 18 and first conductive rod 24 through seal 36 associated with conductive rod 24 through the housing 17 to the seal 36 associated with conductive rod 26 and then through conductive rod 26 to transducer 20. Particularly at cold temperatures when the seals 36 become stiff and the strength of the ultrasonic signal along the direct ultrasonic path 32 between the rods 24 and 26 through the liquid 14 may decrease, the ultrasonic signal along the crosstalk ultrasonic path 37 can obscure the true value of the ultrasonic signal along the direct ultrasonic path 32 and thus adversely affect the functionality or sensitivity of the ultrasonic liquid level sensor 10.

Accordingly, the housing 17 and the location of the seals 36 are designed so that the direct ultrasonic path 32 is substantially different (preferably shorter) than the crosstalk ultrasonic path 37 where the path length is the physical length of the path weighted by the average speed of sound of the materials of the path, for example dividing the path length by the average sound speed. As a result, the signal received through the direct ultrasonic path 32 may be isolated in time from the signal received through the crosstalk ultrasonic path 37 by the sensing circuitry 16.

Specifically, in the embodiment of FIG. 1, the housing 17 provides sleeves 33 which extends along a proximal portion of the length of the rods 26, where the sleeves 33 are separated by a slot 35. The seals 36 are displaced to the ends of the sleeves 33 with the slot 35 ensuring that there is no direct path through the housing 17 between the seals 36 but rather only the circuitous path around the slot 35. Generally, the wave group velocity of the material of the plastic housing 17 will be one third of that of the metal rod 24. Negligible ultrasound energy is conducted from the plastic housing 17 into the liquid 14.

Figure 2:
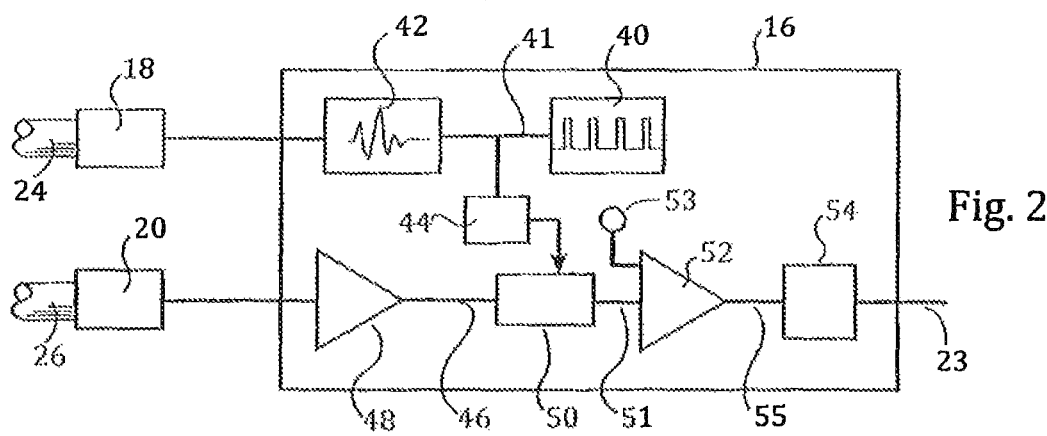

Referring now to FIG. 2, the sensing circuitry 16 may be implemented as discrete circuitry according to techniques known in the art or as software in a microcontroller providing analog to digital converter inputs and executing a stored program to implement the functions that will now be described. During operation, the sensing circuitry 16 may implement a pulse timer 40 to generate a periodic pulse signal 41. This pulse signal 41 is received by a pulse generator 42 which applies a signal (for example a short pulse burst of the appropriate ultrasonic frequency) to transducer 18 to produce an extensional wave through rod 24 as has been described. Acoustic signals through crosstalk ultrasonic path 37 and direct ultrasonic path 32 (if liquid 14 is present) are received by transducer 20 through rod 26 and amplified by amplifier 48 which may also include standard filtering circuitry (e.g. band pass filtering) tuned to the frequency of the pulses generated by the pulse generator 42 to produce amplified and processed signal 46.

The amplified and processed signal 46 may be received by a sampler 50 which is activated by a delay timer 44 in turn triggered by the pulse signal 41 so as to sample the processed signal 46 within a sampling window beginning as determined by the delay timer 44 and continuing a predetermined time thereafter. The length of time between triggering of the delay timer 44 and activation of the sampler 50 is such as to provide a sample 51 of the signal received along direct ultrasonic path 32 before the signal along crosstalk ultrasonic path 37 is received, the latter having a longer acoustic path length.

This sample 51 of processed signal 46 is analyzed by analyzer 52 which may compare the sample 51 to a predetermined threshold 53 having amplitude between the amplitude of sample 51, when there is no liquid 14 within the gap 27, and the amplitude of the sample 51, when there is liquid 14 in the gap 27, to provide a signal 55 indicating whether the liquid 14 is at the predetermined liquid height 29. The signal 55 may be digitized for serial transmission on lead 23 by serial transmitter 54.

Figure 3:
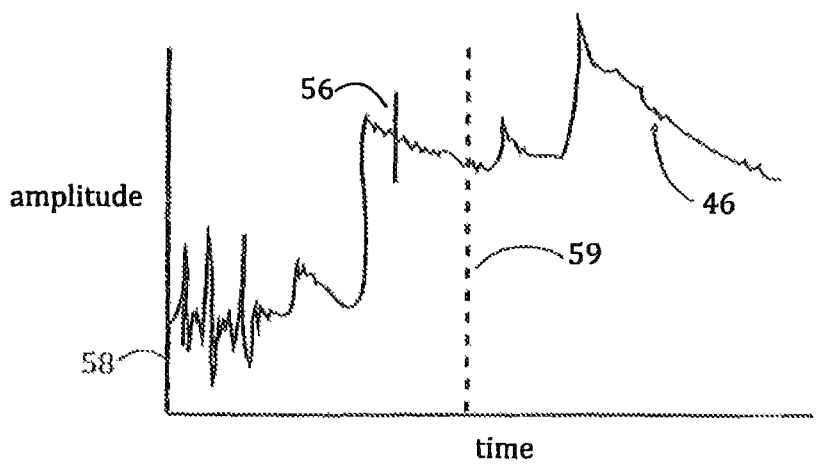
FIG. 3 is a simplified plot of detected ultrasound versus time showing a sampling window used to eliminate crosstalk.

Referring now to FIG. 3, the processed signal 46 may be sampled at time 56 after time 58 coincident with the generation of the acoustic pulse triggered by pulse signal 41. This time 56 is set to be before a time 59 at which crosstalk will be received by transducer 20 along crosstalk ultrasonic path 37 so as to substantially eliminate the effect of crosstalk on the measurement.

Referring now to FIG. 4, the conductive rods 24 and 26 of the sensing unit 12 may be placed within a chamber 60 held within a larger liquid containing reservoir 62. Particularly when the liquid 14 is oil, the liquid 14' within the reservoir 62 outside of the chamber 60 may include significant volumes of entrained air in the form of bubbles 64. These bubbles 64 can reduce the acoustic coupling between the rods 24 and 26 when liquid 14 fills the gap 27 and thus are desirably reduced. This reduction may be done by limiting the communication between the chamber 60 and the reservoir 62 by means of an aperture 70 located near the bottom of the chamber 60. The amount of liquid flowing through the aperture 70 is only that necessary to equalize the liquid levels within the chamber 60 and the reservoir 62 and thus, when the liquid level is substantially constant, even though the liquid 14' is being rapidly exchanged in the reservoir 62 relatively little liquid will flow through aperture 70. This allows the liquid 14 within the chamber 60 to eliminate entrained air through natural percolation and reduces the introduction of new air-entrained fluid from reservoir 62. In addition, the aperture 70 may be part of a baffle port 66. Specifically the baffle port 66 may include a plate 68 in front of aperture 70 and attached to a lower portion of the wall of the reservoir 62 requiring that liquid 14' must pass upward over a lip of the plate 68 then downward through the aperture 70. This circuitous path tends to eliminate bubbles 64. The plate 68 may be spaced from the aperture 70 by approximately the diameter of the aperture 70. The result is that the liquid 14 provides the same liquid height as the liquid 14' but with substantially reduced air entrainment.

Referring now to FIG. 5, the displacement in time of the signal measuring acoustic energy along the crosstalk ultrasound path 37 from the signal measuring acoustic energy along the direct path (not shown in FIG. 5) may be produced not by a slot 35 but by axial displacements of the seals 36 from each other. In FIG. 5, this displacement is provided through equal lengths of the sleeves 33a and 33b, like those in FIG. 1, but by sleeves 33a and 33b extending unequal lengths along a portion of the length of the rods 24 and 26. The seals 36 are displaced to the distal ends of the sleeves 33a and 33b. Here the difference in length of the sleeves 33a and 33b increases the crosstalk ultrasound path 37.

Referring now to FIG. 6, a housing 17' constructed of metal may also be used with the drawback of higher sound velocity through the metal of housing 17' than would be obtained through the plastic of the previously described housings 17. This greater sound velocity may be accommodated by substantially increasing the lengths of the sleeves 33 in the design of FIG. 1 to extend nearly the entire length of the rods 26 as sleeves 33' thus effectively increasing the size of the slot 35 (and thus the crosstalk ultrasonic path 37) to accommodate this higher sound velocity. This increase in the crosstalk ultrasonic path 37 may be augmented by a decrease in the direct ultrasonic path 32 by substantially narrowing the gap 27 through the liquid by a curvature inward toward each other of the rods 26 at their distal ends.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A liquid level sensor comprising:
   a housing holding an ultrasonic transmitting transducer and an ultrasonic receiving transducer;
   first and second ultrasonic conducting rods each communicating respectively with one of the transmitting transducer and receiving transducer and extending out of apertures in the housing to be received within a liquid to be measured, the ultrasonic conducting rods being separated across a gap receiving liquid therebetween;
   seals between the first and second ultrasonic conducting rods and corresponding apertures in the housing;
   wherein the seals are positioned to provide:
   (a) a first acoustic delay along a shortest acoustic path from the transmitting transducer through the first ultrasonic conductive rod through a first seal through the housing to the second seal through the second ultrasonic conducting rod to the receiving transducer that is longer than:
   (b) a second acoustic delay along a shortest acoustic path from the transmitting transducer through the first ultrasonic conductive rod through the liquid to the second ultrasonic conducting rod to the receiving transducer for at least one liquid level with respect to the ultrasonic conductive rods;
   wherein the first and second ultrasonic conducting rods extend through the apertures in an extension direction away from the transmitting transducer and receiving transducer to provide a gap between exposed portions of the first and second ultrasonic conducting rods displaced from the seals in the extension direction so that the seals may be removed from liquid between the exposed portions.

2. The liquid level sensor of claim 1 wherein the housing includes a first and second sleeve extending along the ultrasonic conducting rods holding the seals at distal ends of the sleeves, the sleeves separated by a slot increasing a length of the first acoustic path through the housing from the distal ends of the sleeves.

3. The liquid level sensor of claim I wherein the ultrasonic conducting rods extend generally parallel to a common axis and wherein the housing includes at least one sleeve holding the seal of one of first and second ultrasonic connecting rods at a distal end of the sleeve at a location further displaced along a common axis than the location of the seal of a different one of the first and second ultrasonic connecting rods, increasing a length of the first acoustic path.

4. The liquid level sensor of claim 1 wherein the housing is a thermoplastic material having a sound velocity measured at a frequency of the transmitting transducer less than half of a sound velocity of the conductive rods.

5. The liquid level sensor of claim 1 wherein the housing is a metal having a sound velocity measured at a frequency of the transmitting transducer substantially equal to the sound velocity of the conductive rods.

6. The liquid level sensor of claim 1 wherein the ultrasonic conducting rods are substantially straight and mutually parallel.

7. The liquid level sensor of claim I wherein the ultrasonic conducting rods have a main portion that is substantially straight and mutually parallel and a distal portion curving inward toward each other.

8. The liquid level sensor of claim 1 wherein the seals are an elastomeric material.

9. The liquid level sensor of claim I including signal processing circuitry measuring an amplitude of a signal received by the receiving transducer in a sample window displaced from a time of excitation of the transmitting transducer to substantially exclude a measurement of sound passing along the first path.

10. A liquid level sensor comprising:
    a housing holding an ultrasonic transmitting transducer and an ultrasonic, receiving transducer;
    first and second ultrasonic conducting rods each communicating resectivel with one of the transmitting transducer and receiving transducer and extending out of apertures in the housing to be received within a liquid to be measured, the ultrasonic conducting rods being seperated across a g receiving liquid therebetween;
    seals between the first and second ultrasonic conducting rods and corresponding apertures in the housing;
    wherein the seals are positioned to provide:
    (a) a first acoustic delay along a shortest acoustic path from the transmitting transducer through the first ultrasonic conductive rod through a first seal through the housing to the second seal through the second ultrasonic conducting rod to the receiving transducer that is longer than:
    (b) a second acoustic delay along a shortest acoustic path from the transmitting transducer through the first ultrasonic conductive rod through the liquid to the second ultrasonic conducting rod to the receiving transducer for at least one liquid level with respect to the ultrasonic conductive rods,
    further including:
    signal processing circuitry measuring an amplitude of a signal received by the receiving transducer in a sample window displaced from a time of excitation of the transmitting transducer to substantially exclude a measurement of sound passing along a first acoustic path from the transmitting transducer through the first ultrasonic conductive rod through a first seal through the housing to the second seal through the second ultrasonic conducting rods to the receiving transducer.

11. The liquid level sensor of claim 10 wherein the signal the sample window is displaced from a time of excitation of the transmitting transducer to substantially include a measurement of sound passing along a second acoustic path from the transmitting transducer through the first ultrasonic conductive rod through the liquid to the second ultrasonic conducting rod to the receiving transducer for at least one liquid level with respect to the ultrasonic conductive rods.

12. The liquid level sensor of claim 11 wherein the sample window ends before a receipt by the receiving transducer of sound along the first acoustic path from the transmitting transducer.

13. The liquid level sensor of claim 11 wherein the housing includes a first and second sleeve extending along the ultrasonic conducting rods holding the seals at distal ends of the sleeves, the sleeves separated by a slot increasing a length of the first acoustic path through the housing from the distal ends of the sleeves.

14. The liquid level sensor of claim 11 wherein the ultrasonic conducting rods extend generally parallel to a common axis and wherein the housing includes at least one sleeve holding the seal at a distal end of the sleeve at a location further displaced along a common axis than the location of the seal on the other of the ultrasonic connecting rods, increasing a length of the first acoustic path.

15. The liquid level sensor of claim 11 wherein the housing is a thermoplastic material having a sound velocity measured at a frequency of the transmitting transducer less than half of a sound velocity of the conductive rods.

16. The liquid level sensor of claim 11 wherein the housing is a metal having a sound velocity measured at a frequency of the transmitting transducer substantially equal to the sound velocity of the conductive rods.

17. The liquid level sensor of claim 11 wherein the ultrasonic conducting rods are substantially straight and mutually parallel.

18. The liquid level sensor of claim 11 wherein the ultrasonic conducting rods have a main portion that is substantially straight and mutually parallel and a distal portion curving inward toward each other.

19. The liquid level sensor of claim 11 wherein the seals are an elastomeric material.

20. A method of measuring liquid level height using a liquid level sensor having:

a housing holding an ultrasonic transmitting transducer and an ultrasonic receiving transducer;

first and second ultrasonic conducting rods each communicating respectively with one of the transmitting transducer and receiving transducer and extending out of apertures in the housing to he received within a liquid to be measured, the ultrasonic conducting rods being separated across a gap receiving liquid therebetween;

seals between the first and second ultrasonic conducting rods and corresponding apertures in the housing;

wherein the seals are positioned to provide:

(a) a first acoustic delay along a shortest acoustic path from the transmitting transducer through the first ultrasonic conductive rod through a first seal through the housing to the second seal through the second ultrasonic conducting rods to the receiving transducer that is longer than:

(b) a second acoustic delay along a shortest acoustic path from the transmitting transducer through the first ultrasonic conductive rod through the liquid to the second ultrasonic conducting rod to the receiving transducer for at least one liquid level with respect to the ultrasonic conductive rods;

the method comprising the steps of:

(a) transmitting a signal from a transmitting transducer through a first conducting rod into a liquid to be received in a second ultrasonic conductive rod adjacent to the first electronic conductive rod and conducted to the receiving transducer;

(b) sampling a signal from the receiving transducer at a time after the transmitting of the signal from the transmitting transducer liquid level sensor;

(c) measuring an amplitude of a signal received by the receiving transducer in a sample window displaced from a time of excitation of the transmitting transducer to substantially exclude a measurement of sound passing along a first acoustic path from the transmitting transducer through the first ultrasonic conductive rod through a first seal through a housing to the second seal through the second ultrasonic conducting rods to the receiving transducer.

* * * * *